United States Patent [19]

Ross

[11] 3,840,117

[45] Oct. 8, 1974

[54] UNDERDRAIN STRUCTURE FOR WASTE EFFLUENT FILTER AND METHOD OF USING SAME

[75] Inventor: David S. Ross, Lorain, Ohio

[73] Assignee: Hydro-Clear Corporation, Avon Lake, Ohio

[22] Filed: Apr. 30, 1973

[21] Appl. No.: 355,679

[52] U.S. Cl..................... 210/80, 210/82, 210/274, 210/293
[51] Int. Cl............................................ B01d 23/24
[58] Field of Search .......... 210/63, 80, 82, 274, 293

[56] References Cited
UNITED STATES PATENTS

| | | | |
|---|---|---|---|
| 2,710,692 | 6/1955 | Kegel et al. | 210/274 |
| 2,888,140 | 5/1959 | Hebert | 210/275 |
| 3,459,302 | 8/1969 | Ross | 210/293 X |
| 3,613,888 | 10/1971 | Harris | 210/274 |

FOREIGN PATENTS OR APPLICATIONS

| | | | |
|---|---|---|---|
| 949,882 | 9/1956 | Germany | 210/275 |
| 298,867 | 12/1954 | Switzerland | 210/293 |

*Primary Examiner*—John Adee

[57] ABSTRACT

An improvement in a waste effluent filter of the type including a tank having a lower portion, a filter bed of particulate material, an underdrain cavity adjacent the lower portion of the tank, means for draining filtered effluent from the underdrain cavity, means for allowing air to enter the underdrain cavity to occupy the space not filled by filtered effluent, and means for selectively forcing liquid into the underdrain cavity and upwardly through the filter bed, which improvement includes an air and liquid distributing device secured in the underdrain cavity. The air and liquid distributing device includes a plurality of separate air chambers opening into the underdrain cavity and having upper aperture means. When a liquid is forced into the underdrain, the chambers are first closed by liquid rising in the underdrain. The air trapped in the respective chambers is compressed by the rising liquid and is forced upwardly through the upper aperture of the chamber into the filter bed. The improvement insures even distribution of the air upwardly through the sand bed and the even distribution of liquid to disintegrate clumps of media and thoroughly wash the filter media.

36 Claims, 12 Drawing Figures

UNDERDRAIN STRUCTURE FOR WASTE EFFLUENT FILTER AND METHOD OF USING SAME

The present invention pertains to the art of filtering solids from a waste liquid effluent, and more particularly to an underdrain structure for a waste effluent filter and the method of using the same.

The present invention is particularly applicable for filtering solids from a waste liquid effluent, which has been previously treated and before the effluent is discharged into a stream or similar repository, and it will be described with particular reference thereto; however, it will be appreciated that the invention has much broader applications and may be used in various systems requiring the removal of solid particles having highly variable physical characteristics from many liquid materials.

It is well known that a liquid effluent which is discharged from a waste treatment installation may have a highly variable quality. A specific characteristic of this quality is suspended solids contained in the effluent. These suspended solids may be highly variable in quality and specific size, and also may be variable in substance. The deleterious effect of these suspended solids in any receiving stream is well known, and regulatory agencies have recognized the need for the elimination of these solids, and have, and are continuing to insist that waste water treatment works be designed or upgraded, in order to eliminate or reduce the quantity of these suspended solids in the waste water treatment plant effluent.

A very effective waste water filter has been developed and is described in my U.S. Pat. No. 3,459,302, issued Aug. 5, 1969. In that patent, a method of increasing the filtering run of a particulate media filter is materially improved by creating currents sweeping over the media surface. This patent is incorporated by reference herein as the general art to which the present invention is directed.

In my prior application Ser. No. 338,198, filed Mar. 5, 1973, as a continuation of application Ser. No. 155,482, filed June 22, 1971, there is disclosed and claimed an improvement in a filter of the type shown in U.S. Pat. No. 3,459,302. This prior application is also incorporated by reference in the present application. In that prior application, there is disclosed a waste effluent filter wherein air is forced upwardly through the filter bed between backwashing cycles. This air dislodges particles adjacent the surface and allows the particles to be lifted and held in suspension by the currents developed in accordance with my prior U.S. Pat. No. 3,459,302. In this manner, the length of the filter run of the waste effluent filter is further increased. The length of a filter run in a waste water filter is critical. The ratio of wash liquid to liquid filtered is a function of the length of run. The wash liquid must be reprocessed. The quantity of backwash liquid must be manageable within the system. In accordance with the preferred embodiment of the invention, as disclosed in my prior application, air is entrapped within the underdrain of the filter and is compressed by pumping water from the clear well of the filter into the underdrain. Further pumping forces the air upwardly through the filter bed to dislodge particles from the bed and carry them into the body of effluent above the upper surface of the filter bed. The present invention relates to an improvement in a waste effluent filter of the type disclosed in the prior application which efficiently distributes the upward moving air that is forced through the filter bed.

By use of the invention, the air and water pass uniformly through the media, and not necessarily through paths of least resistance in the filter bed. All portions of the filter bed are subjected to the upward moving air. This is of primary importance when grease or other relatively tenacious material has accumulated in certain portions of the filter bed.

An effluent from a waste water treatment plant may contain deleterious materials other than suspended solids, such as grease and oil. The materials can penetrate into the media and adhere to the grains causing a section of the media to be clogged very quickly. The grease or oil can also fill the interstices between the various grains of the particulate bed and adhere to the grains quite tenaciously forming strongly bonded clumps in the bed. In addition, very fine suspended solids may also penetrate into the grains and cause a packing of portions of the bed. When the media is deeply packed or large quantities of grease laden grains adhere to each other, air compressed in the underdrain of the filter, as taught by my prior application Ser. No. 338,198, filed Mar. 5, 1973, may be distributed upwardly through the sand bed in an uneven manner which bypasses or avoids the deeply packed or grease plugged areas of the filter bed. A particularly poor waste may cause the packed or plugged areas of the filter bed to increase in size and become more rigid so that the repeated action of compressing air in the underdrain can cause an eruption of the media in the less packed or less plugged areas of the media. This can cause failure of the filtering system and allow suspended solids to pass to the underdrain and then to the system outlet.

The present invention relates to an improvement in the underdrain structure of the filter which can be used in accordance with a filter, wherein air is periodically compressed within the underdrain cavity and forced upwardly through the media to clean the upper interstices of the media bed between backwashing cycles, as disclosed in my prior application mentioned above. One advantage of the present invention is the even distribution of upwardly moving air over the total area of the sand bed to periodically remove plugged or packed areas of the bed. The underdrain eliminates any possibility of an eruption of the media through uneven distribution of air or backwash liquid.

In the operation of some sand filters, air is forced upwardly through the sand bed as an initial step in the backwashing cycle of the filter. This type of filter operation may also experience blow-through or eruption of the media due to the packing or plugging of the filter bed in certain areas. Air under pressure produced as a step in the backwashing cycle will pass upwardly through the weaker sections of the media bed. The immediate onrush of backwashing water from the underdrain will also then tend to follow the path of least resistance which is the path generally followed by the upwardly moving air prior to backwashing. Consequently, during the backwashing cycle the plugged or packed areas of the media will not wash. This can ultimately result in complete failure of the sand bed. These defects have plagued the filter art for some time.

The present invention causes air to flow upwardly through all portions of the bed to dislodge the plugged sections as well as the unplugged sections. In this manner, initial backwashing is generally more uniform throughout the total area of the bed and is not concentrated in the weaker areas of the bed. Upwardly moving liquid during backwashing which is unevenly distributed, can develop very high velocities that may carry the media from the bed to the backwash outlet system. This uneven backwashing and high velocities created thereby results in dissipation of the sand media and requires a more frequent replacement of the particulate material forming the filter bed and may plug the backwashing disposal system. The present invention overcomes these difficulties experienced in the operation of filters, especially when used for waste effluent.

Many attempts have been made to design an underdrain structure to control the evenness and effectiveness of backwashing by the use of orifices. One of such systems is shown for a water works filter in Camp U.S. Pat. No. 3,468,422. This orifice type system is not effective because water or air forced upwardly through the sand filter bed will still pass through the area of least resistance. The use of spaced orifices will not distribute air or water evenly over the surface of the filter. When the area above one orifice is plugged, air and water flow in larger quantities in other areas of lesser resistance. Consequently, the disadvantages discussed above are still present when a plurality of orifices are provided in the underdrain structure of a sand filter. Some systems use large media, such as stones, in an attempt to distribute air and backwashing water over the total under surface of the filter media. These systems still present even more difficulty because the upwardly moving air and liquid will always seek the path of least resistance.

All of these disadvantages are overcome by the present invention which is directed toward a waste effluent filter of the type using a particulate filter bed, which underdrain structure evenly distributes air forced upwardly from the underdrain and also liquid forced upwardly from the underdrain during backwashing.

In accordance with the present invention, there is provided an improvement in a filter of the type generally including a tank having a lower portion, a filter bed of particulate material having an upper surface, an underdrain cavity coextensive with the bed, means for draining the underdrain cavity, means for allowing air to enter the underdrain cavity, and means for forcing liquid into the underdrain cavity, whereby the air is compressed in the underdrain cavity and forced upwardly through the filter bed. This improvement includes an air distributing device secured in the underdrain cavity and including a plurality of air chambers each including a lower opened end communicated with the underdrain and an upper closed end and means forming at least one aperture in the closed ends whereby when liquid is forced into the underdrain, air is entrapped within the separate chambers by the liquid level rising and closing the lower opened ends of the chambers. Thereafter, additional water forced into the underdrain individually forces air from each of the separate chambers. These chambers are distributed uniformly in the underdrain cavity to encompass each of the various sections of the filter bed so that each of the sections is subjected to air forced upwardly through the bed, irrespective of a plugged or clogged condition of the filter bed in certain areas. This allows all portions of the filter bed to be subjected to the upwardly moving air from the underdrain. The air does not pass upwardly through only the portions of the filter bed having lower resistance. By entrapping air in the separate chambers, even the plugged portions of the filter bed are subjected to the air.

In accordance with another aspect of the present invention there is provided a method of operating a waste effluent filter of the type defined above, which method includes providing a plurality of chambers communicated by an upper orifice with the filter bed and communicated with the underdrain cavity substantially below the orifice; allowing effluent to filter through the bed into the underdrain cavity; allowing air to accumulate in the chambers during the filter step; forcing liquid into the underdrain cavity until air is entrapped in the individual chambers; continuing the forcing step until some entrapped air from each of the chambers is compressed and forced from the chambers by the liquid.

The primary object of the present invention is the provision of a waste effluent filter of the type including a particulate filter bed, which filter includes a structure within the underdrain to provide uniform distribution of air upwardly through the filter bed at times between backwashing and also to provide uniform distribution of air immediately prior to backwashing.

Another object of the present invention is the provision of a filter as mentioned above which provides uniform flow of backwashing liquid through the filter bed during the backwashing operation.

These and other objects and advantages will become apparent from the following description taken together with the accompanying drawings in which.

Referring now to the drawings wherein the showings are for the purpose of illustrating a preferred embodiment of the invention only and not for the purpose of limiting same, FIGS. 1-5 schematically illustrate a filter A for filtering waste effluent prior to ultimate disposal. In accordance with the illustrated embodiment of the invention, the filter includes a tank 10, particulate media, such as sand, forming a sand bed 12 having an upper surface 14, and an underdrain cavity 16 having a lower wall 18. In the underdrain cavity there is provided an outlet 20 which is connected to a backwash pump 22 having a source of clear liquid 24. The tank containing liquid 24 is not shown but does hold a sufficient amount of clear, filtered effluent 24 for the purpose of backwashing the filter bed 12 at appropriate times. A valve 20a in outlet 20 controls flow of liquid from cavity 16, and valve 20b controls flow from pump 22 to the cavity. A waste effluent inlet 26 is positioned above the surface 14, and a backwash outlet 27 is also located over the surface 14. A valve 27a controls the operation of the backwash outlet 27, which is generally connected to a mud well or backwash receiving tank, not shown. Also above the surface, in accordance with my prior U.S. Pat. No. 3,459,302, there is provided a diffuser 28 extending over surface 14 for the purpose of creating currents in a body of effluent above this surface. These currents lift larger particles from surface 14 and tend to hold the particles in suspension within the upper body of effluent. As is taught by my prior patent, the diffuser 28 creates fine bubbles which cause the currents within the effluent. These currents also hold in suspension solid particles removed from the sand bed 12 during the pulse cleaning operation, which is described in my prior application Ser. No. 338,198, filed Mar. 5, 1972, as a continuation of my prior application Ser. No. 155,482 filed June 22, 1971. A conduit 30 allows air to enter into the underdrain cavity 16 to fill the space not filled by filtered effluent passing through bed 12. In waste effluent filters, of the type to which the invention is directed, a volume of air is accumulated within underdrain cavity 16. Conduit 30 may be extended as a standpipe to contain a column of liquid to correspond to the pressures applied to the underdrain cavity 16, or an air vent valve 32 may be installed at the vent outlet to permit flow of air in both directions and prevent the flow of liquid when pressure is applied to the filtered effluent within the underdrain cavity.

Figure 1:
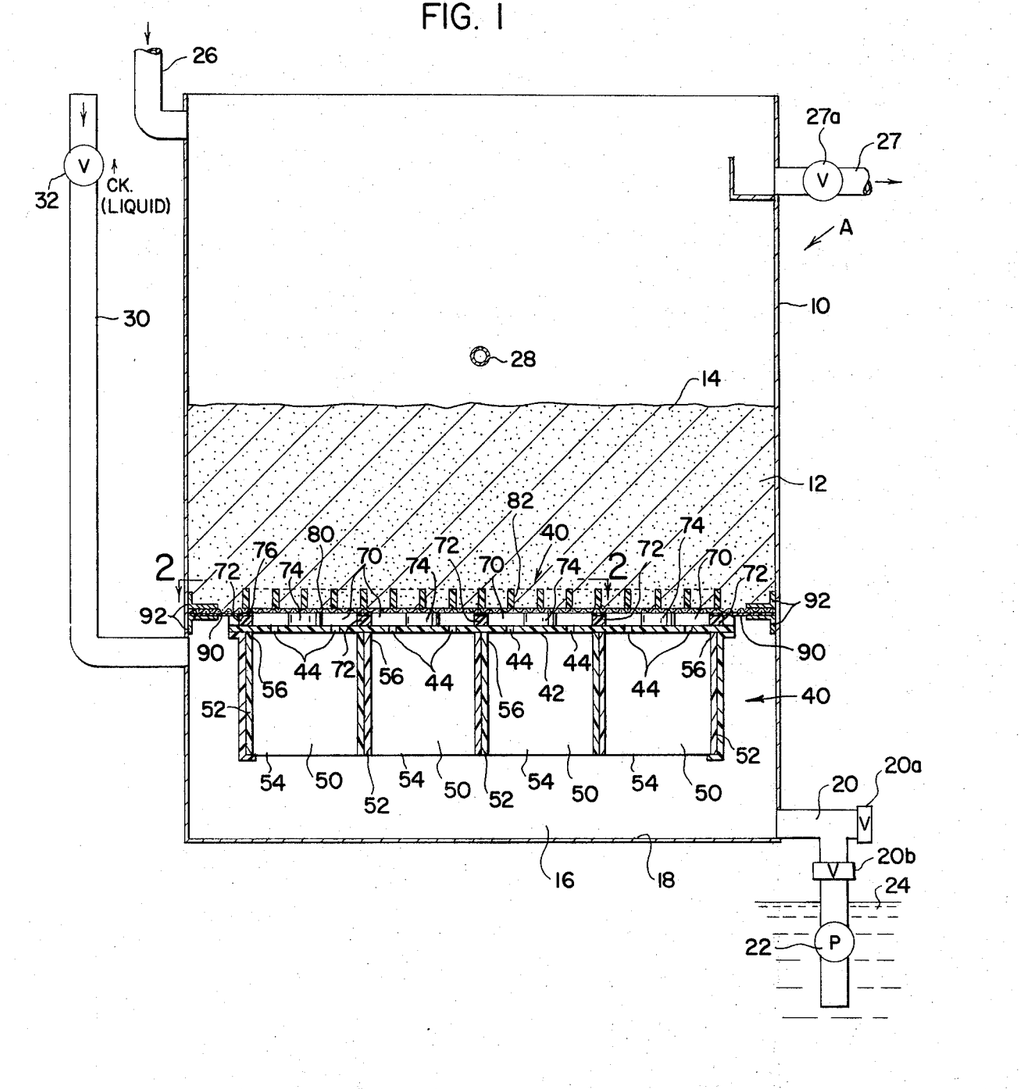
FIG. 1 is a side elevational view showing, somewhat schematically, the preferred embodiment of the present invention.
Figure 2:
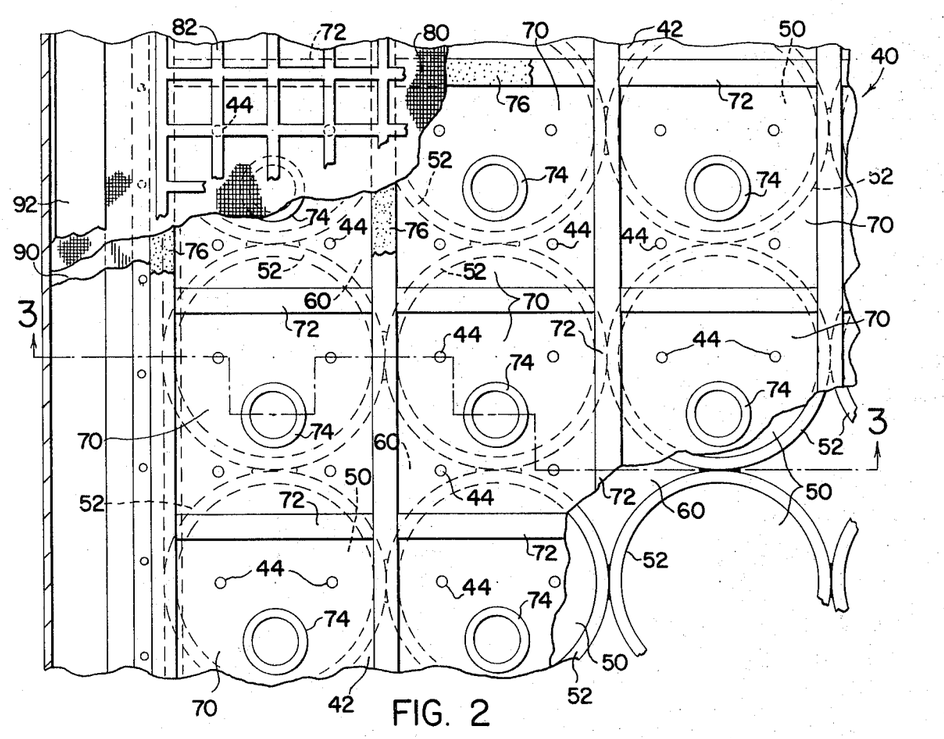
FIG. 2 is an enlarged view taken generally along line 2—2 of FIG. 1.
Figure 3:
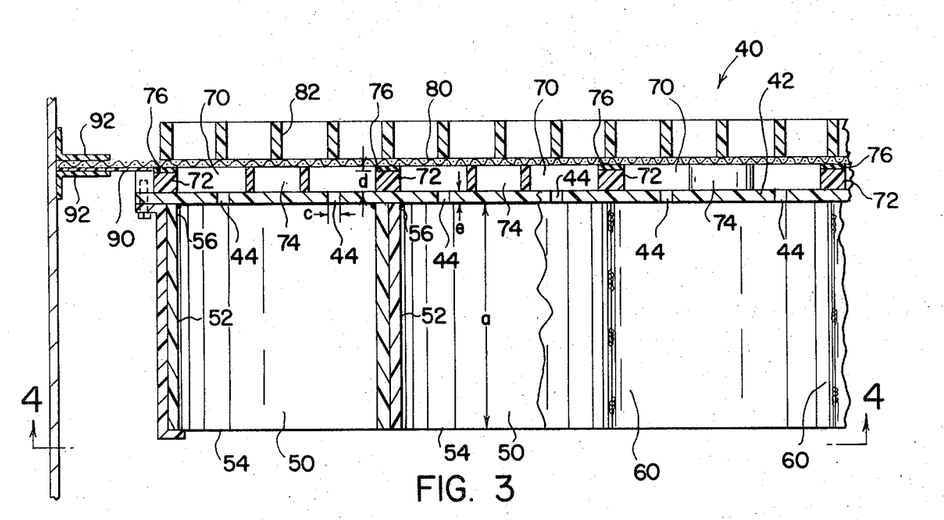
FIG. 3 is a cross-sectional view taken generally along line 3—3 of FIG. 2.
Figure 4:
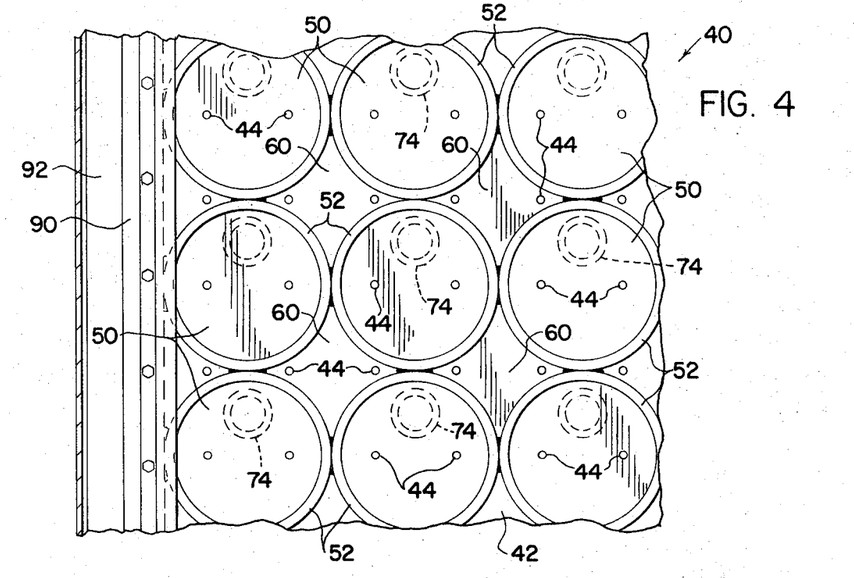
FIG. 4 is a view taken generally along line 4—4 of FIG. 3.
Figure 5:
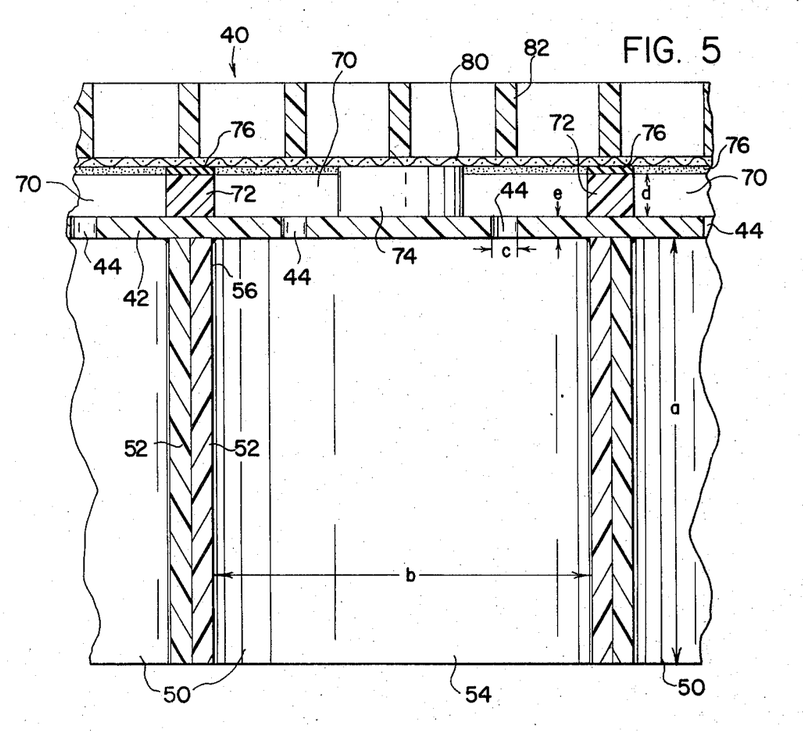
FIG. 5 is an enlarged view showing the preferred embodiment of the present invention.

In accordance with the present invention, as best shown in FIGS. 1-5, there is an underdrain structure 40 in the underdrain cavity 16 which is used to distribute air, in a manner to be explained later, and also to support the sand bed 12. In accordance with the preferred embodiment of the invention, the underdrain structure 40 includes a plate 42 generally coextensive with bed 12 and having a plurality of uniformly distributed apertures 44 which provide spaced openings between underdrain cavity 16 and filter bed 12. Consequently, plate 42 includes a plurality of spaced apertures 44. Below the plate 42 there is provided a plurality of chambers 50 formed from sleeves 52 having lower open ends 54 and upper ends 56 which are generally closed by plate 42. The sleeves 52 are secured together as best shown in FIG. 4 and are secured onto the underside of plate 42, as best shown in FIGS. 3 and 5. Since this embodiment of the invention forms chambers 50 by cylindrical sleeves 52, additional chambers 60 are created by four adjacent sleeves, as shown in FIG. 4. Each of the chambers 50, 60 extends vertically downwardly from the plate 42 into the underdrain cavity at a position substantially spaced above bottom wall 18. By their structure, the chambers include a lower generally unobstructed open end at end 54 of sleeves 52 and an upper closed end defined by the plate 42. The upper ends are closed except for two apertures 44 in each of the chambers 50, 60 as best shown in FIG. 4. Consequently, each of the separate chambers 50, 60 has two relatively small upper openings, or apertures 44.

Above the plate 42 there are provided upper pockets 70, best shown in FIGS. 2 and 5, which pockets include peripheral rims 72 formed from a matrix of plastic bars. In the illustrated embodiment, these pockets surround four apertures 44 in the plate 42. Consequently, each of the pockets 70 is communicated with at least two separate, but adjacent chambers 50, or 60, as is best shown by the dotted lines in FIG. 2. Of course, a different number of apertures could be provided in the pockets and the pockets could communicate with one or more lower chambers. For a purpose to be described later, a central support sleeve 74 is positioned within each pocket 70. A seal 76 is positioned on the upper surfaces of peripheral rims 72 forming the individual pocket 70 to seal the pockets with respect to each other by a coaction of the seals 76 with an upper flat perforated plate, or screen 80 resting upon the seals. The vertical height of center support sleeve 74 is essentially the combined height of the rim bars 72 and seals 76. This provides a support structure for the media support screen 80. The free area of the support screen 80 covering the pockets does not restrict the flow of filtrate to the apertures or impede the flow of air and liquid in the reverse direction.

In accordance with the illustrated embodiment of the invention, screen 80 is held onto the upper surface defined by sleeves 74 and seals 76 by a hold down grate 82. This covers the pockets 70 so that the pockets define a particular selected portion of the filter bed 12 which comes under the influence of the individual pockets. Seals 76 isolate the various areas of the filter bed 12 from each other so that each of the pockets 70 act substantially independent of the other pockets. This assists in the even distribution effect of the underdrain structure 40, as will be described later. Air can not move in a generally transverse direction between adjacent pockets.

Underdrain structure 40 is generally coextensive with the under surface of bed 12. To prevent flow around structure 40, there is provided a peripheral seal 90 which extends from the side of tank 10 to the outer rims 72 of the peripherally positioned pockets 70. Seat 90 is held with respect to the outer wall of tank 10 by appropriately positioned brackets 92.

The operation of the present invention as so far described is illustrated in FIGS. 6-12, wherein like numbers refer to like parts. All of the elements need not be labeled for the purpose of understanding the operation of the invention. It is appreciated that the chambers 50 and 60 extend in a uniform pattern over the total area of sand bed 12. Only a limited number of these chambers are shown in any of the drawings, since these chambers are identical and their operation can be easily appreciated by the limited number illustrated. The actual number of chambers which would be used depends somewhat on the area of the bed. Each of the chambers acts upon a relatively limited portion of the total filter bed area. Consequently, each of the pockets can receive air from more than one chamber. The number of apertures 44 and the arrangement of the chambers can be varied as will be appreciated with the description of the operation of the structure 40.

In FIGS. 6–12, the illustrated chambers are designated 50a, 50b, 50c and 50d to indicate four separate chambers in the lower portion of structure 40. These chambers are illustrated as adjacent chambers; however, the operation of the other chambers in structure 40 is identical to the operation of the four adjacent chambers shown in these drawings.

Figure 6:
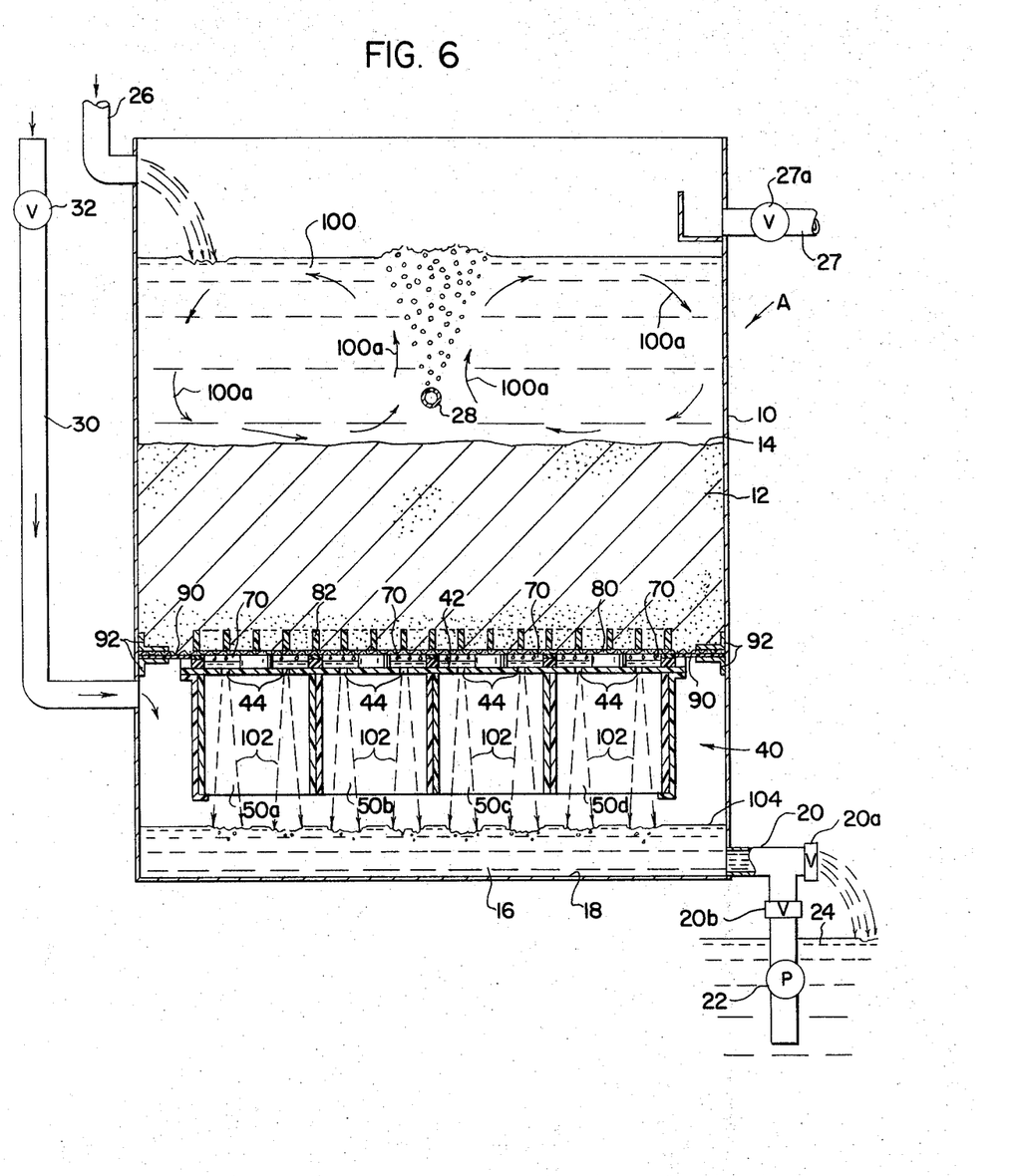
FIG. 6 is a view, similar to FIG. 1, illustrating normal filtering operation of the filter.

Referring now to FIG. 6, during normal operating conditions the filter A is illustrated. Secondary waste effluent is entering tank 10 from inlet 26 and the body of effluent 100 has been developed over the surface 14. Diffuser 28 creates currents 100a to lift larger particles from the surface 14. Filtered effluent passing through bed 12 accumulates in pockets 70 where it flows in streams 102 through the chambers 50a–d into the underdrain cavity 16. The upper level 104 of the liquid in the underdrain cavity is below the lower ends of the separate chambers; therefore, air from conduit 30 fills the remainder of the underdrain cavity 16 which includes the downwardly extending chambers 50a–50d. Effluent from the underdrain cavity 16 passes through valve 20a into the clear well, in accordance with normal practice. Of course, the filtrate could also pass through pump 22 as an alternative method for allowing egress of filtered effluent from the underdrain cavity 16.

Figure 7:
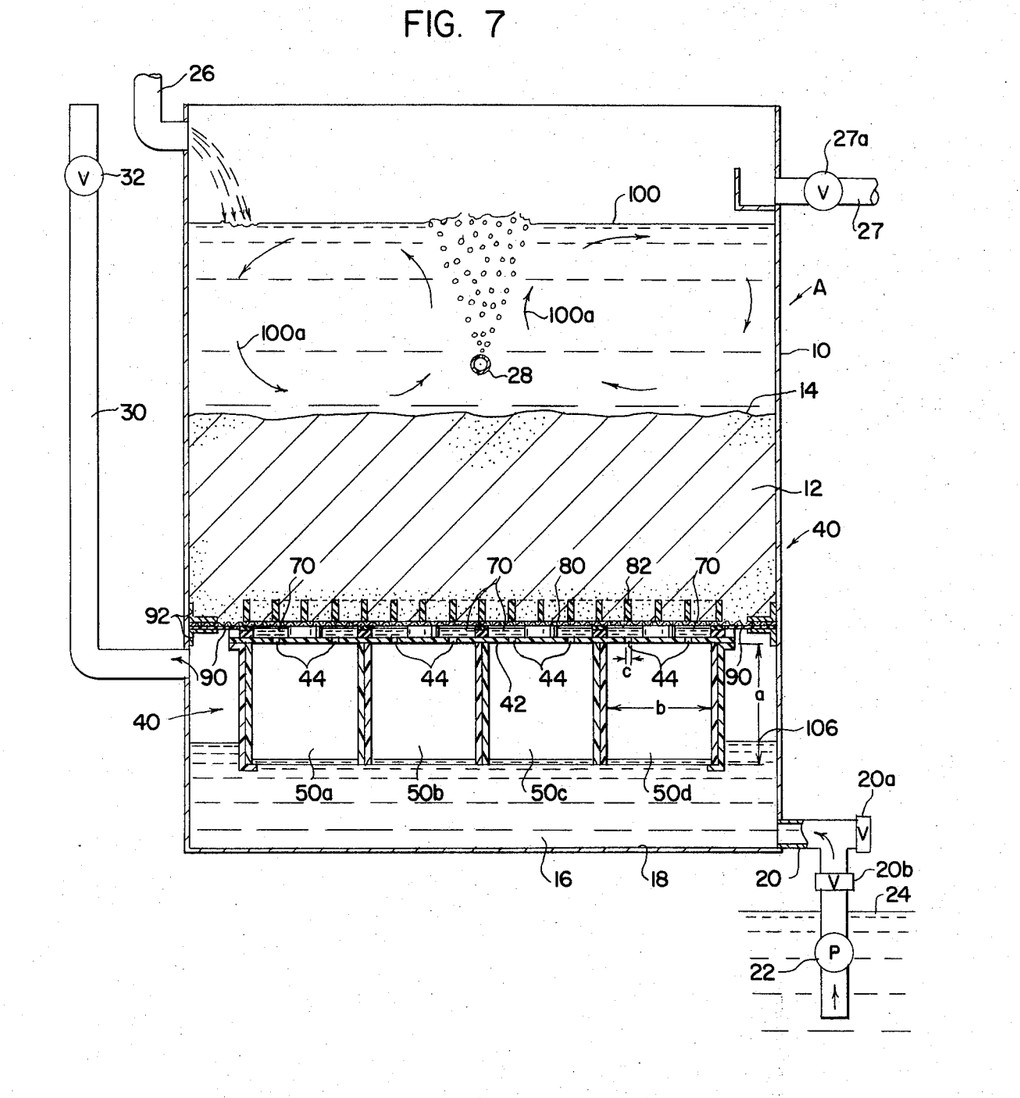
FIG. 7 is a view, similar to FIG. 1, showing the initial forcing of liquid into the underdrain for forcing air upwardly through the filter bed.

When it is desired to force air upwardly through bed 12 for the purpose of cleaning the interstices of the media between backwashing cycles, the pump 22 is actuated, valve 20a is closed and valve 20b is opened. This is shown in FIG. 7. The level 106 of the filtered effluent within the underdrain cavity 16 has been increased to a position above the lower ends of the chambers 50a–50d. This forcing of clear liquid, generally the previously filtered effluent, closes the separate chambers 50a–50d to entrap air within these chambers. The liquid level 106 outside the underdrain structure 40 rises to expel air outside of the vent conduit 30. The general volume of air in all the chambers is substantially the same as the chamber volume. Pockets 70 now become somewhat filled with liquid because of the pressure exerted in an upward direction by the air to momentarily stop the filtering process.

Figure 8:
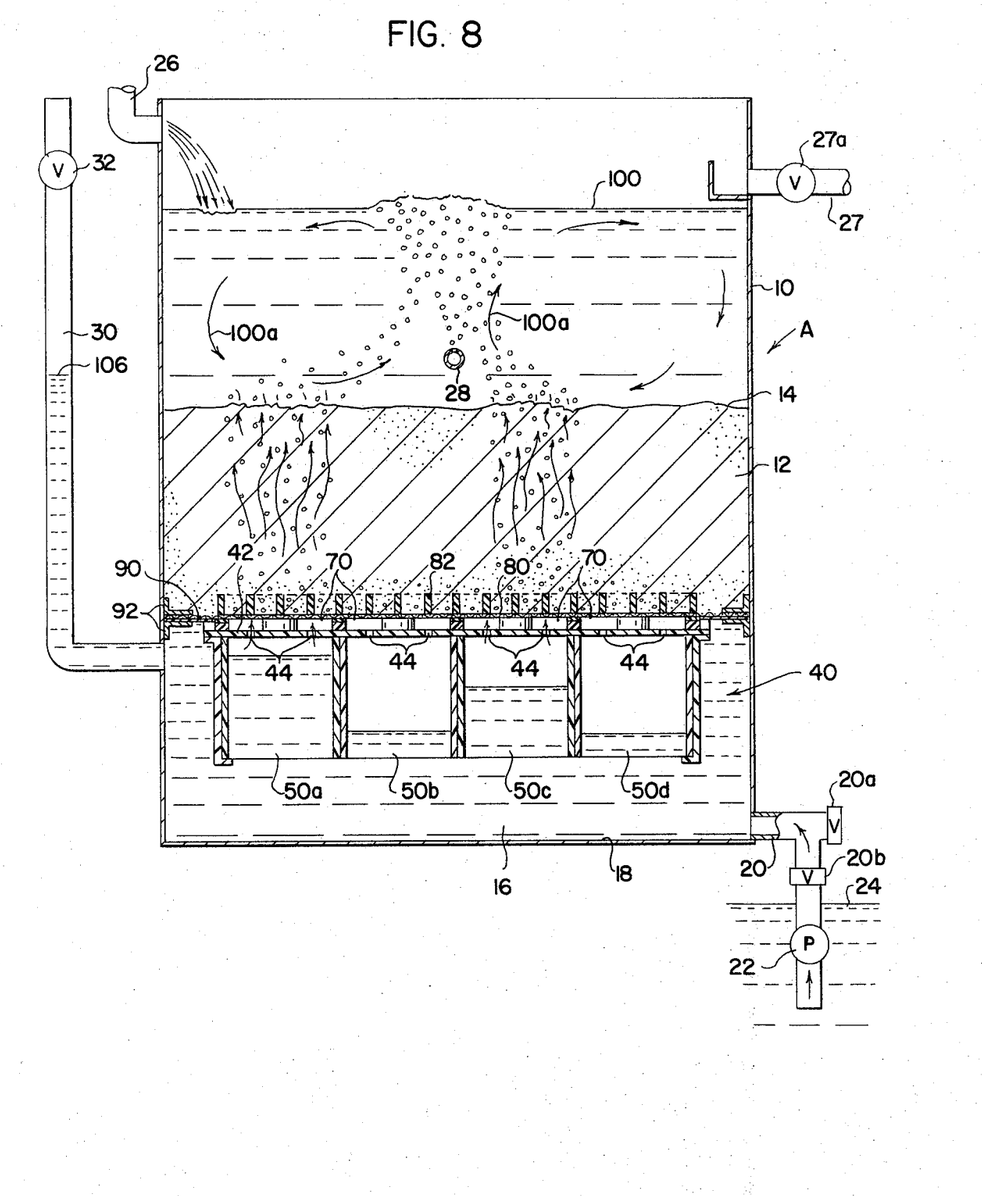
FIG. 8 is a view, similar to FIG. 1, showing the operation of the preferred embodiment of the present invention with continued forcing of liquid upwardly from the underdrain system.

Continued pumping of the liquid into the underdrain cavity 16 by pump 22 creates the condition shown in FIG. 8. Liquid rises in conduit 30 to a level corresponding to the pressure in underdrain cavity 16 and the pressure is increased on the air in the individual chambers 50a–d. At this time, the liquid level in the individual chambers will rise in accordance with resistance above the particular chamber and more particularly above the pocket 70 to which the chambers are connected. As illustrated in FIG. 8, this resistance may be different at different chambers; therefore, the level of liquid in the various chambers is different. This rising liquid level compresses the air. The air being compressed in the various chambers by the rising water level is forced from the apertures 44 and through the screen 80 over pockets 70. Thereafter, the air passes into the sand bed 12 causing clogging materials in the upper portion of the sand bed to be pushed by air to the surface 14 and breaking materials loose that have been adhered to the media surfaces. The currents 100a will lift these particles from the surface and/or maintain the particles in suspension within body 100. In the illustrated example, the section of bed 12 above chamber 50a is less clogged than the area above the other chambers. Pressure created in this chamber is no greater than that to overcome the resistance experienced directly over the pocket 70 communicated with the chamber 50a; therefore, the liquid level in chamber 50a rises more rapidly. Gaskets 76 prevent compressed air from the various chambers and their upper pockets from shifting horizontally into adjacent areas of the bed; therefore, the air is forced to go upwardly through the sand bed 12. Air can pass through apertures 44 with very little resistance compared to the resistance of water passing under force through these apertures. This is a well understood phenomenon regarding flow of liquid and gas through similar conduits. The upflow of the air through the sand bed 12 occurs without upsetting the sand bed and the rate of this flow is controlled by the rate at which liquid is pumped into the underdrain cavity 16.

Figure 9:
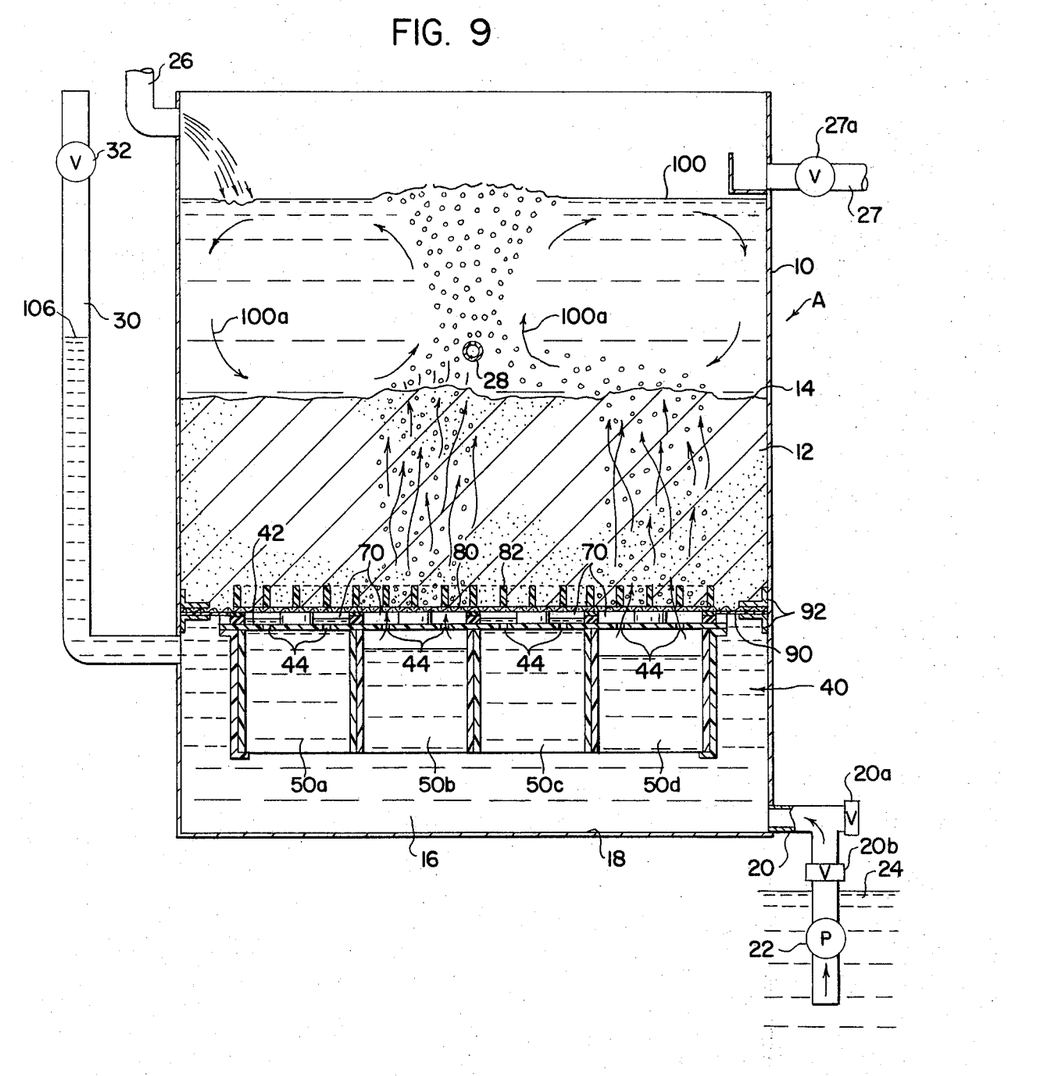
FIG. 9 is a view, similar to FIG. 1, showing a continuation of the operation illustrated in FIG. 8 with air from some of the chambers of the preferred embodiment expelled.
Figure 10:
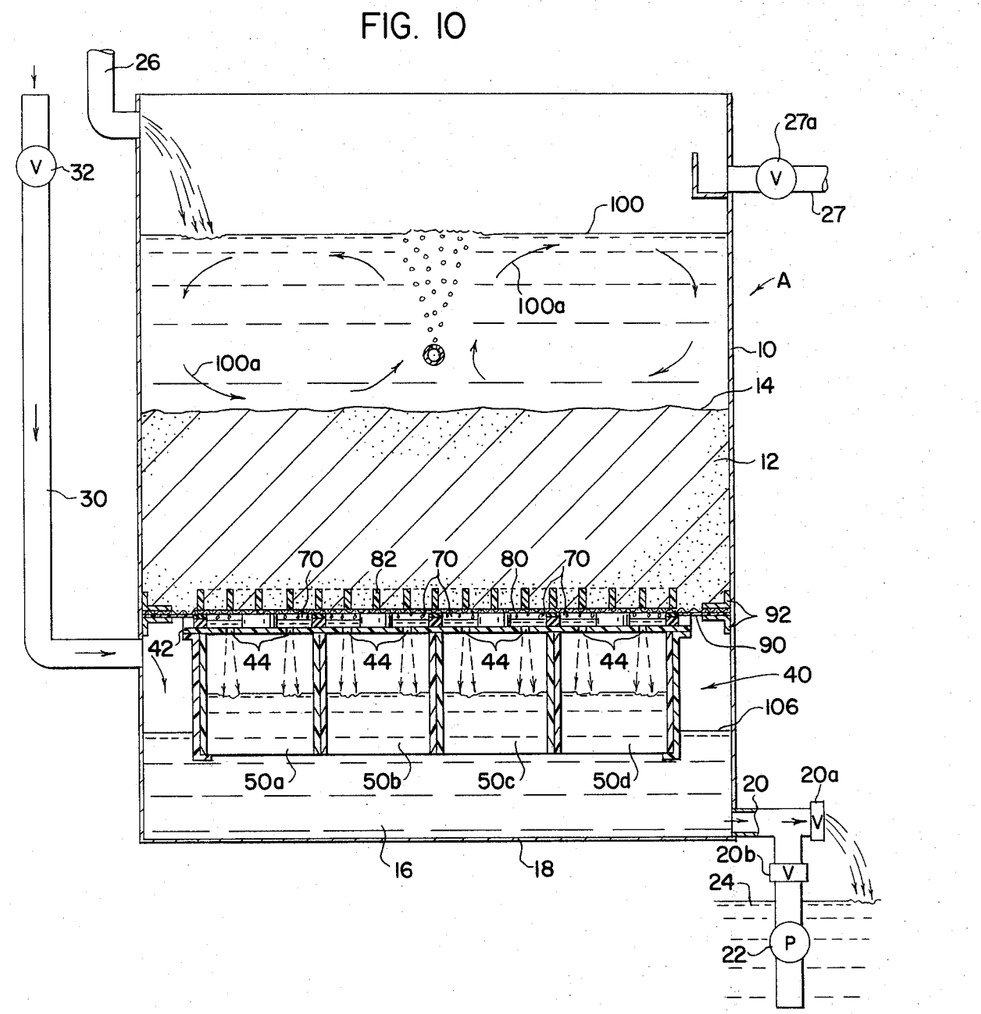
FIG. 10 is a view, similar to FIG. 1, showing the operation of the preferred embodiment upon discontinuation of the forcing of liquid into the underdrain.

As the liquid in a particular chamber 50a–d reaches the plate 42, the water attempts to pass through the apertures 44. The resistance to the flow of liquid to these apertures creates a larger pressure in the underdrain cavity forcing the water level to rise in the other chambers. Level 106 will rise in conduit 30. This is generally shown in FIG. 9 wherein the chambers 50a–50c have become filled with liquid. Thereafter, increased pressure caused by pumping of liquid into the underdrain cavity is exerted on the other chambers 50b, 50d which still include entrapped air above the liquid level. At this stage, the resistance to flow of apertures 44 in chambers 50a and 50c is greater than the resistance to flow of air into the media in chambers 50b and 50d. Consequently, when in the condition shown in FIG. 9, the pressure on the liquid within the underdrain cavity is primarily directed toward forcing the air from chambers 50b, 50d into the sand bed to effect cleaning of the limited area directly above these portions of the underdrain structure 40. The liquid from the underdrain will generally not enter the media to any extent until all of the air has been compressed and driven from all chambers 50a–50d. This assures that air is forced equally through all portions of the filter bed during an operation cycle shown in FIGS. 6–9. The operation cycle shown in FIGS. 6–9 is used primarily to clean the interstices of the media. The pump 22 is stopped after the air from the underdrain cavity has been substantially forced through the media, and valve 20a is opened allowing liquid within the underdrain cavity 16 to drain into the clear well. When this happens, the level of liquid in the underdrain starts to decrease. This reduces the level of liquid in each of the chambers 50a–d, as illustrated in FIG. 10, until the condition illustrated in FIG. 6 is again reached. This pulsing operation can be repeated a number of times before the filter A actually requires backwashing for cleaning the filter bed.

Figure 11:
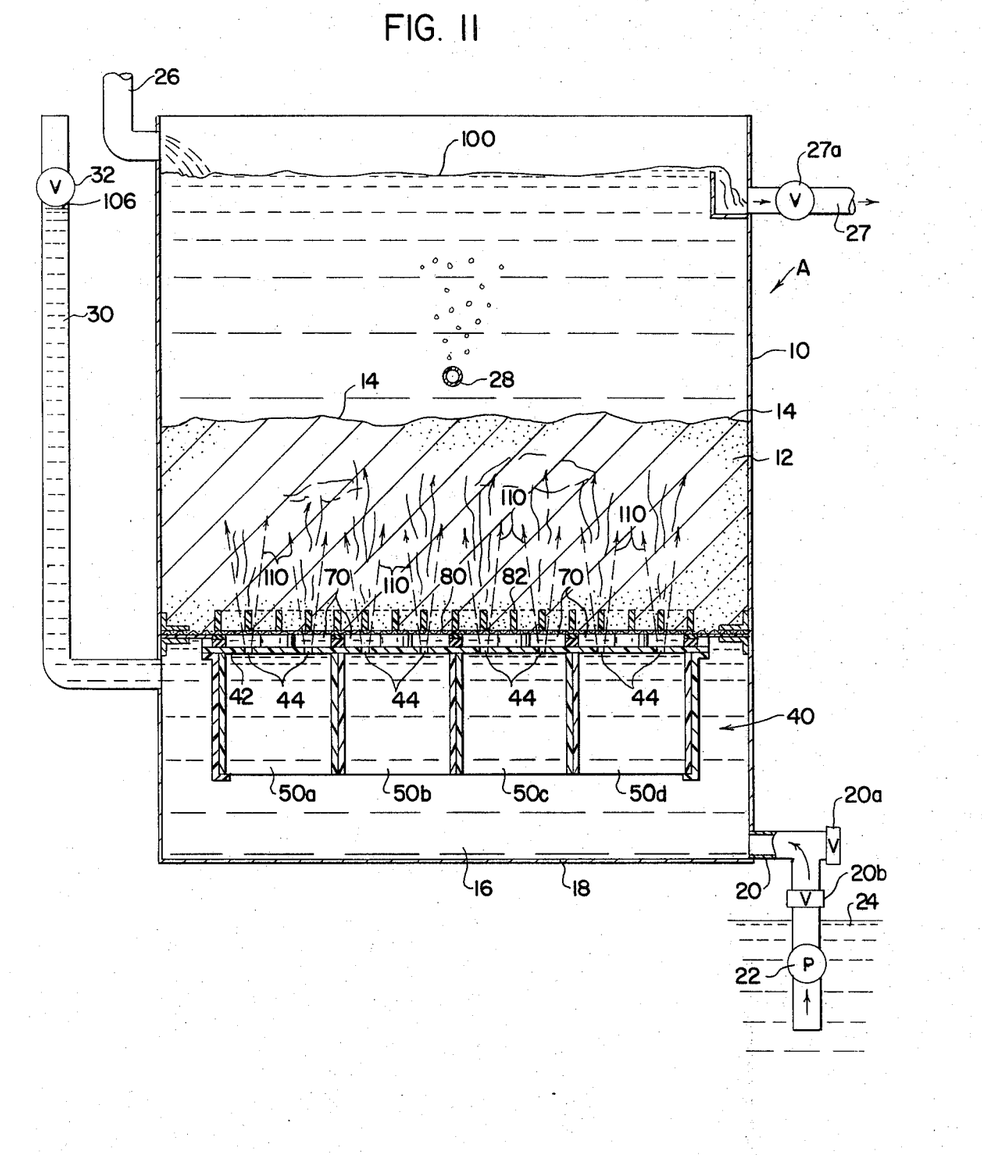
FIG. 11 is a view, similar to FIG. 1, illustrating the backwashing operation when liquid initially enters the filter media of the preferred embodiment of the present invention; and, FIG. 12 is a view, similar to FIG. 1, showing continued backwashing of the filter.
Figure 12:
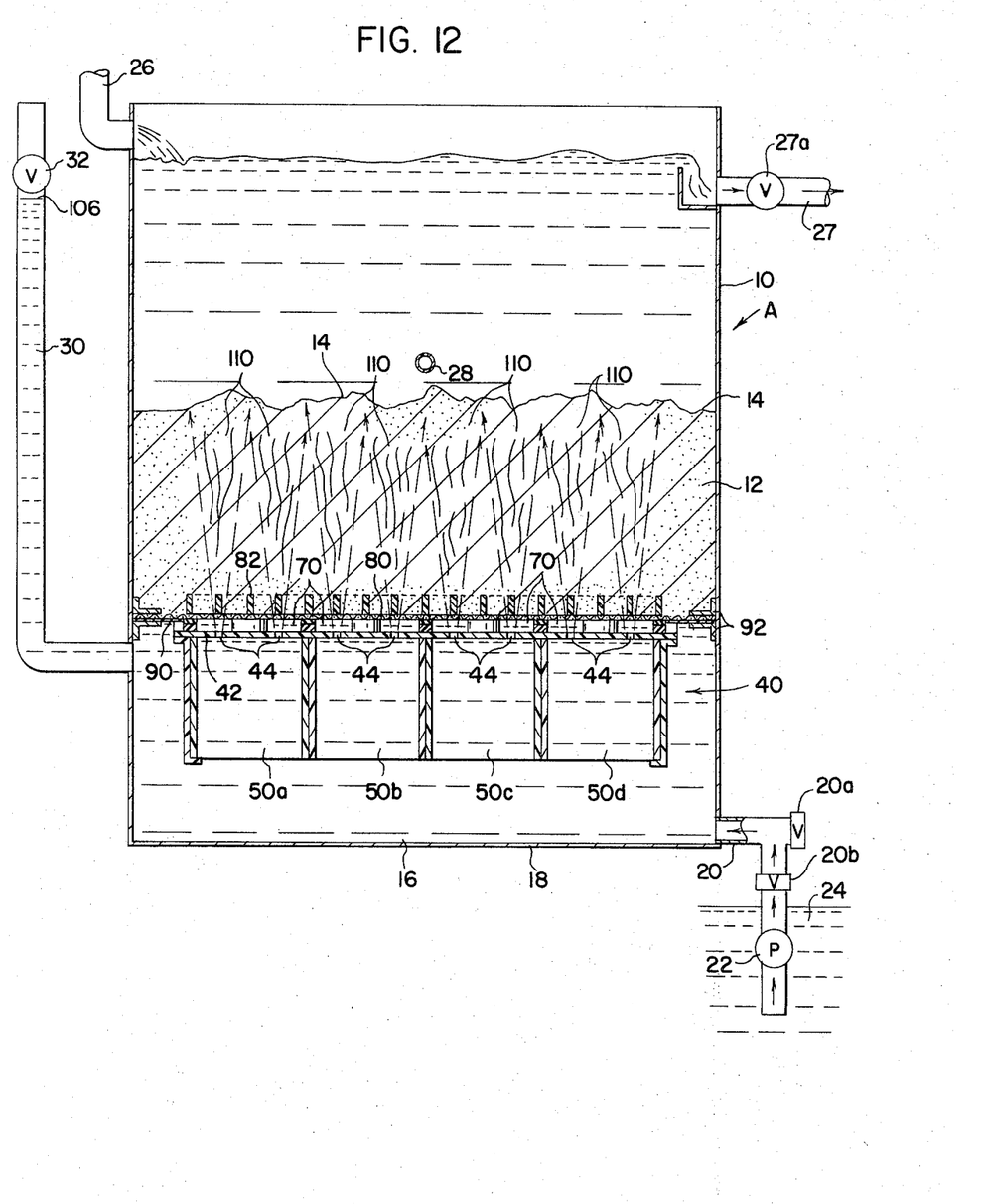

The present invention also has certain advantages during the backwashing of a filter. During the backwashing cycle pump 22 forces liquid into the underdrain cavity 16. This causes the operation previously described with respect to expelling compressed air from the separate chambers 50a–50d. During the backwashing operation, the pump 22 continues to operate even after all the entrapped air has been pushed upwardly to the sand bed from the various chambers 50a–d. At that time, and referring now to FIG. 11, the liquid enters the sand bed 12 through the apertures 44. This initial liquid will lift portions of the media and fold other portions for a few seconds until jets 110 have been established from the apertures into the sand bed. These jets 110 act somewhat as augers and bore through the media clearly disintegrating any clumps of cohered particles and thoroughly cleaning the separate particles of the sand bed. Thereafter, as shown in FIG. 12, the jets 110 create high velocity streams within the media causing the individual grains to move against each other and scrub the deleterious material from the surfaces of the grains. The jets then carry them into the upper portion of tank 10. During the backwashing cycle, as shown in FIGS. 11 and 12, the valve 27a is opened so that backwashing liquid is expelled through outlet 27 into appropriately positioned mud well.

Various dimensions can be used for the components described in the present disclosure; however, as one example of a structure constructed in accordance with the invention, the length a of the chamber 50, as shown in FIG. 5, is 5.0 inches. The diameter b of the sleeve forming this chamber is 5.5 inches which happens to be a standard size for 5 inch tubing. The apertures 44 have a diameter c of approximately 5/16 inches. Rims 72 are formed from a square PVC stock having a width d of approximately ½ inch. In this example, plate 42 has a thickness e of approximately ¼ inches. Of course, various modifications could be made in this particular construction and still practice the invention. It is noted that the five inch sleeve members encompass only a relatively small area of the total filter bed surface. This provides distribution of the air over various portions of the bed. The outlet 20 for the underdrain is constructed so that the level of liquid within the underdrain cavity during filtering is below the under surfaces of the various chambers 50, 60. The chambers can be rectangular or have any other shape. The quantity of air expelled can be increased by size of the lower chambers. The rate of flow may be changed by adjusting the pumping rate of pump 22.

Having thus described my invention, I claim:

1. In a waste effluent filter including a tank having a lower portion, a filter bed of particulate material having an upper surface, an underdrain cavity adjacent said lower portion, under said bed and generally coextensive with said bed, means for draining from said underdrain cavity filtered effluent after said filtered effluent has passed through said bed, means for allowing air to enter said underdrain cavity, and means for forcing liquid into said underdrain cavity whereby said air is compressed in said underdrain cavity and forced upwardly through said bed, the improvement comprising: an air distributing device secured in said underdrain cavity, said device comprising means defining a plurality of generally vertically extending chambers below said bed and positioned in a pattern coextensive with said bed with a majority of said chambers being surrounded by adjacent chambers, each of said chambers having an inner cavity, a lower open end opening into said underdrain cavity and having a first area and a generally closed upper end adjacent said bed, and at least one means for forming an aperture in said upper end for communicating said inner cavity with said bed whereby when said liquid is forced into said underdrain cavity, said aperture having a second area substantially less than said first area, said liquid closes said open ends and then forces air entrapped in said chambers upwardly through said aperture and through said bed.

2. The improvement as defined in claim 1 wherein said underdrain cavity is defined by a lower wall and said open ends are spaced from said wall.

3. The improvement as defined in claim 1 including means for forming a plurality of pockets above said upper ends and below said bed, each of said pockets having an open upper end and being communicated with at least one of said apertures.

4. The improvement as defined in claim 3 including a perforated member over said pockets for supporting said bed.

5. The improvement as defined in claim 4 wherein said pockets each have a peripheral, upwardly extending rim and a seal between said rim and said perforated member.

6. The improvement as defined in claim 1 wherein a majority of said chambers are formed from a cylindrical sleeve member and an upper plate forms said generally closed end.

7. The improvement as defined in claim 6 wherein a plate member forms said upper plate of more than one chamber.

8. The improvement as defined in claim 1 including a plate member forming said closed ends of more than one of said chambers.

9. In a waste effluent filter including a tank having a lower portion, a filter bed of particulate material having an upper surface, an underdrain cavity adjacent said lower portion, under said bed and generally coextensive with said bed, means for draining from said underdrain cavity filtered effluent after said filtered effluent has passed through said bed, means for allowing air to enter said underdrain cavity, and means for forcing liquid into said underdrain cavity whereby said air is compressed in said underdrain cavity and forced upwardly through said bed, the improvement comprising: an air distributing device secured in said underdrain cavity, said device comprising means defining a plurality of chambers having a lower opening communicated with said underdrain cavity and a generally closed upper end adjacent said bed, with a majority of said chambers being surrounded by adjacent chambers, means in said closed end defining an aperture for allowing generally free flow of air and limited flow of liquid and means for forming a plurality of pockets above said upper ends and below said bed, each of said pockets having an open upper end and being communicated with at least one of said apertures.

10. The improvement as defined in claim 9 wherein said underdrain cavity is defined by a lower wall and said openings of said chambers are spaced from said wall.

11. The improvement as defined in claim 9 including a perforated member over said pockets for supporting said bed.

12. The improvement as defined in claim 11 wherein said pockets each have a peripheral, upwardly extending rim and a seal between said rim and said perforated member.

13. The improvement as defined in claim 9 wherein a majority of said chambers are formed from a cylindrical sleeve member and an upper plate forms said generally closed upper ends.

14. The improvement as defined in claim 13 wherein a plate member forms said upper plate of more than one chamber.

15. The improvement as defined in claim 9 including a plate member forming said closed upper ends of more than one of said chambers.

16. In a waste effluent filter including a tank having a lower portion, a filter bed of particulate material having a minimum dimension transversely across said bed and an upper surface, an underdrain cavity adjacent said lower portion, under said bed and generally coextensive with said bed, means for draining from said underdrain cavity filtered effluent after said filtered effluent has passed through said bed, means for allowing air to enter said underdrain cavity, and means for forcing liquid into said underdrain cavity whereby said air is compressed in said underdrain cavity and forced upwardly through said bed, the improvement comprising: an air distributing device secured in said underdrain cavity, said device comprising means defining a plurality of chambers below said bed, each of said chambers having maximum transverse dimension substantially less than said minimum dimension of said bed, said chambers including an inner cavity, a lower opened end communicated with said underdrain cavity and an upper generally closed end, means forming an aperture in said upper end to allow generally free flow of air and limited flow of liquid and means for forming a plurality of pockets above said upper ends and below said bed, each of said pockets having an open upper end and being communicated with at least one of said apertures.

17. The improvement as defined in claim 16 wherein said underdrain cavity is defined by a lower wall and said opened ends are spaced from said wall.

18. The improvement as defined in claim 16 wherein said chambers are formed from cylindrical members extending vertically below said bed.

19. The improvement as defined in claim 18 wherein said underdrain cavity is defined by a lower wall and said cylindrical elements are spaced from said wall at said open ends.

20. The improvement as defined in claim 16 including a perforated member over said pockets for supporting said bed.

21. The improvement as defined in claim 20 wherein said pockets each have a peripheral, upwardly extending rim and a seal between said rim and said perforated member.

22. The improvement as defined in claim 16 including a plate member forming said closed ends of more than one of said chambers.

23. In a waste effluent filter including a tank having a lower portion, a filter bed of particulate material having an upper surface, an underdrain cavity adjacent said lower portion, under said bed and generally coextensive with said bed, means for draining from said underdrain cavity filtered effluent after said filtered effluent has passed through said bed, means for allowing air to enter said underdrain cavity, and means for forcing liquid into said underdrain cavity whereby said air is compressed in said underdrain cavity and forced upwardly through said bed, the improvement comprising: an air distributing device secured in said underdrain cavity, said device comprising a generally flat plate having a plurality of apertures therein, means supporting said plate in said underdrain cavity and below said bed, a plurality of generally hollow members secured to said plate and extending downwardly into said underdrain cavity, each of said members encompassing at least one of said apertures and having a lower open end communicated with said underdrain cavity.

24. A method of operating a waste effluent filter having a filter bed with an upper surface and formed of particulate material, an underdrain cavity below said bed, said method comprising the steps of:
 a. providing a plurality of chambers communicated by an upper orifice with said bed and communicated with said underdrain cavity substantially below said orifice, each of said chambers having a generally closed upper end including said upper orifice and a lower end allowing generally free flow of liquid into and from said chambers;
 b. allowing said effluent to filter through said bed into said underdrain cavity;
 c. allowing air to accumulate in said chambers during said filtering step;
 d. forcing liquid into said underdrain cavity until air is trapped in said chambers;
 e. continuing said forcing step until some entrapped air from each of said chambers is compressed and forced from said chambers by said liquid.

25. The method as defined in claim 24 including the additional step of:
 f. discontinuing said liquid forcing when substantially all of said entrapped air has been forced from at least a majority of said chambers.

26. The method as defined in claim 24 including the additional step of:
 f. discontinuing said liquid forcing when substantially all of said entrapped air has been forced from the last of said chambers.

27. The method as defined in claim 24 including the additional step of:
 f. creating currents in a body of effluent above said surface at least during said continued forcing step said currents tending to hold in suspension any solids in said body of effluent.

28. The method as defined in claim 24 including the additional step of:
 f. creating fine air bubbles in a body of effluent above said surface at least during said continued forcing step, said currents tending to hold in suspension any solids in said body of effluent.

29. In a waste effluent filter including a tank having a lower portion, a filter bed of particulate material having a minimum dimension transversely across said bed and an upper surface, an underdrain cavity adjacent said lower portion, under said bed and generally coextensive with said bed, means for draining from said underdrain cavity filtered effluent after said filtered effluent has passed through said bed, means for allowing air to enter said underdrain cavity, and means for forcing liquid into said underdrain cavity whereby said air is compressed in said underdrain cavity and forced upwardly through said bed, the improvement comprising: an air distributing device secured in said underdrain cavity, said device comprising a plurality of air chambers including a lower opened end communicated with said underdrain and an upper generally closed end, means forming at least one aperture in said closed end, means forming a plurality of pockets, each pocket having an upper opened end facing said bed and communicated with at least one of said apertures, said open ends forming a distributing plane generally coextensive with said bed, and a perforated member extending over said opened ends of said pockets.

30. The improvement as defined in claim 28 wherein said open ends of said pockets are defined by a peripheral edge and sealing means between said peripheral edges of said pockets and said perforated member.

31. The improvement as defined in claim 23 including means forming a plurality of pockets above said generally flat plate and below said bed, each of said pockets having an open upper end and being communicated with at least one of said apertures.

32. The improvement as defined in claim 31 including a perforated member over said pockets for supporting said bed.

33. The improvement as defined in claim 32 wherein said pockets each have a peripheral upwardly extending rim and a seal between said rim and said perforated member.

34. In a liquid filter including a tank having a lower portion, a filter bed of particulate material having an upper surface, an underdrain cavity adjacent said lower portion, under said bed and generally coextensive with said bed, means for draining from said underdrain cavity filtered effluent after said filtered effluent has passed through said bed, and means for forcing liquid into said underdrain cavity whereby liquid in said underdrain cavity is forced upwardly through said bed, the improvement comprising: a generally flat perforated means generally parallel to said upper surface for supporting said filter bed, said supporting means being generally coextensive with said upper surface and allowing a generally free flow of liquid in both directions therethrough; means forming a liquid collecting cavity below said supporting means; said cavity forming means including a lower member spaced from said supporting means; an orifice means in said member and spaced below said supporting means with said orifice means vertically aligned with said perforated supporting means, and, means for forcing liquid through said orifice means to create a high velocity liquid jet passing in a generally straight vertical direction from said orifice means through said supporting means and into said bed.

35. A method of backwashing a liquid filter having a filter bed with an upper surface and formed of particulate material, an underdrain cavity below said bed and a perforated bed supporting member over said cavity to allow generally free flow of liquid in both directions through said member, said method comprising the steps of:
  a. allowing said liquid to filter through said bed and supporting member in a first direction and into said underdrain cavity;
  b. backwashing said bed by passing a backwashing liquid in a second direction opposite to said first direction; and,
  c. causing said backwashing liquid to flow as separate high velocity liquid jets passing in a generally straight vertical direction through said supporting member and into said bed from positions below said bed, said jets being closely spaced to provide uniform water flow through said bed during backwashing.

36. In a liquid filter including a tank having a lower portion, a filter bed of particulate material having an upper surface, an underdrain cavity adjacent said lower portion, under said bed and generally coextensive with said bed, means for draining from said underdrain cavity filtered effluent after said filtered effluent has passed through said bed, means for allowing air to enter said underdrain cavity, and means for forcing liquid into said underdrain cavity whereby said air is compressed in said underdrain cavity and forced upwardly through said bed, the improvement comprising: an air distributing device secured in said underdrain cavity, said device comprising means defining a plurality of generally vertically extending chambers below said bed and positioned in a pattern coextensive with said bed, each of said chambers having an inner cavity, a lower end opening into said underdrain cavity and having a first area and a generally closed upper end adjacent said bed, and at least one means for forming an aperture in said upper end for communicating said inner cavity with said bed whereby when said liquid is forced into said underdrain cavity, said aperture having a second area substantially less than said first area, said liquid closes said open ends and then forces air entrapped in said chambers upwardly through said aperture and through said bed, a plurality of pockets above said upper end, each of said pockets having an open upper end and being communicated with at least one of said apertures, a perforated member over said pockets for supporting said bed and allowing generally free flow of liquid to pockets from said bed and from said pockets to said bed and means for inhibiting liquid flow between said pockets.

* * * * *